US012692337B2

(12) United States Patent (10) Patent No.: US 12,692,337 B2
Zhao et al. (45) Date of Patent: Jul. 28, 2026

(54) VOLUME EXPANDABLE SORBENT MATERIAL FOR CAPTURE OF ORGANIC FLUIDS AND SOLVENTS AND METHODS OF MAKING THE SAME

(71) Applicant: CASE WESTERN RESERVE UNIVERSITY, Cleveland, OH (US)

(72) Inventors: Boran Zhao, Cleveland, OH (US); Kristen Rohm, Cleveland, OH (US); Xuehui Gong, Cleveland, OH (US); Fan Wang, Cleveland, OH (US); Donald Feke, Cleveland, OH (US); Ica Manas-Zloczower, Cleveland, OH (US)

(73) Assignee: CASE WESTERN RESERVE UNIVERSITY, Cleveland, OH (US)

( * ) Notice: Subject to any disclaimer, the term of this patent is extended or adjusted under 35 U.S.C. 154(b) by 923 days.

(21) Appl. No.: 17/946,081

(22) Filed: Sep. 16, 2022

(65) Prior Publication Data

US 2023/0079213 A1 Mar. 16, 2023

Related U.S. Application Data

(60) Provisional application No. 63/244,881, filed on Sep. 16, 2021.

(51) Int. Cl.
*C08F 265/06* (2006.01)
*C08J 9/00* (2006.01)

(52) U.S. Cl.
CPC ........... *C08F 265/06* (2013.01); *C08J 9/0061* (2013.01); *C08J 2351/00* (2013.01); *C08J 2467/02* (2013.01)

(58) Field of Classification Search
CPC .... C08F 265/06; C08J 9/0061; C08J 2351/00; C08J 2467/00; C08J 9/28; C08J 2201/026; C08J 2201/028; C08J 2205/044; C08J 2205/05; C08J 2333/04; B01J 20/267; B01J 20/28045; B01J 20/3085; B01J 20/3425; B01J 20/3491; Y02A 20/204
See application file for complete search history.

(56) References Cited

U.S. PATENT DOCUMENTS

| | | | |
|---|---|---|---|
| 5,260,345 A | 11/1993 | Desmarais et al. | |
| 5,331,015 A | 7/1994 | Desmarais | |
| 5,387,207 A | 2/1995 | Dyer | |
| 5,506,035 A | 4/1996 | Van Phan | |
| 5,643,238 A | 7/1997 | Baker | |
| 5,770,634 A | 6/1998 | Dyer | |
| 5,827,909 A * | 10/1998 | DesMarais | B01F 23/43 |
| | | | 521/64 |
| 5,851,648 A * | 12/1998 | Stone | A61F 13/53713 |
| | | | 521/64 |
| 5,869,171 A | 2/1999 | Shiveley | |

| | | | |
|---|---|---|---|
| 5,899,893 A | 5/1999 | Dyer | |
| 5,971,730 A | 10/1999 | Thary | |
| 5,985,434 A | 11/1999 | Qin | |
| 6,127,595 A | 10/2000 | Makoui | |
| 6,186,992 B1 | 2/2001 | Roe | |
| 6,231,960 B1 | 5/2001 | Dyer | |
| 6,245,697 B1 | 6/2001 | Conrad | |
| 6,426,445 B1 | 7/2002 | Young | |
| 6,673,984 B1 | 1/2004 | Roe | |
| 6,808,791 B2 | 10/2004 | Curro | |
| 6,830,800 B2 | 12/2004 | Curro | |
| 6,863,960 B2 | 3/2005 | Curro | |
| 6,878,433 B2 | 4/2005 | Curro | |
| 6,884,494 B1 | 4/2005 | Curro | |
| 7,037,569 B2 | 5/2006 | Curro | |
| 7,125,603 B2 | 10/2006 | Curro | |
| 7,220,332 B2 | 5/2007 | Curro | |
| 7,588,822 B2 | 9/2009 | Flohr | |
| 7,717,893 B2 | 5/2010 | Hird | |
| 7,875,362 B2 | 1/2011 | Mitsukami | |
| 7,935,099 B2 | 5/2011 | Sue | |
| 8,007,614 B2 | 8/2011 | Schneider | |
| 8,143,472 B1 | 3/2012 | Bragd | |
| 8,225,729 B2 | 7/2012 | Macdonald | |
| 8,378,000 B2 | 2/2013 | Hintz | |
| 8,470,440 B2 | 6/2013 | Dalal | |
| 8,906,497 B2 | 12/2014 | Marchgraber | |
| 9,028,632 B2 | 5/2015 | Schneider | |
| 9,039,855 B2 | 5/2015 | Schneider | |
| 9,050,213 B2 | 6/2015 | Lavon | |
| 9,072,633 B2 | 7/2015 | Autran | |
| 9,220,637 B2 | 12/2015 | Roe | |

(Continued)

FOREIGN PATENT DOCUMENTS

WO WO-0034454 A2 * 6/2000 ................ C08F 2/24

OTHER PUBLICATIONS

Rohm et al., "Poly(HIPE) morphology, crosslink density, and mechanical properties influenced by surfactant concentration and composition," Colloids and Surfaces A, 583 (2019) 123913, 1-11. (Year: 2019).*

*Primary Examiner* — K. Boyle

(74) *Attorney, Agent, or Firm* — McDonald Hopkins LLC

(57) ABSTRACT

A compact, highly expandable sorbent made from polymeric materials is contemplated. The resulting sorbent can absorb more than 20 times its original volume owing to an internal foam-like structure having micron-level voids bisected by internal struts which themselves have nano-level pores. Further, this sorbent can be compressed and reused multiple times, thereby making it an ideal substance to facilitate separation of disparate fluids, such as oils floating on or within an aqueous solution.

4 Claims, 10 Drawing Sheets

(56) References Cited

U.S. PATENT DOCUMENTS

| | | |
|---|---|---|
| 9,221,195 B2 | 12/2015 | Hargett |
| 9,289,941 B2 | 3/2016 | Hamilton |
| 9,308,130 B2 | 4/2016 | Mansfield |
| 9,414,975 B2 | 8/2016 | Maldonado |
| 9,469,791 B2 | 10/2016 | Knutson |
| 9,492,334 B2 | 11/2016 | Blessing |
| 9,844,477 B2 | 12/2017 | Schneider |
| 9,895,271 B2 | 2/2018 | Walsh |
| 9,962,296 B2 | 5/2018 | Mansfield |
| 9,999,552 B2 | 6/2018 | Varga |
| 10,137,674 B2 | 11/2018 | Kline |
| 10,300,164 B2 | 5/2019 | Bunnelle |
| 10,307,986 B2 | 6/2019 | Venkitaraman |
| 10,308,843 B2 | 6/2019 | Bunnelle |
| 10,357,407 B2 | 7/2019 | Bunnelle |
| 10,376,426 B2 | 8/2019 | Nishikawa |
| 10,391,002 B2 | 8/2019 | Mansfield |
| 10,555,840 B2 | 2/2020 | Hundorf |
| 10,575,993 B2 | 3/2020 | Lenser |
| 10,596,043 B2 | 3/2020 | Digiacomantonio |
| 2002/0022426 A1 | 2/2002 | Curro |
| 2005/0197414 A1 | 9/2005 | Desmarais et al. |
| 2008/0107861 A1 | 5/2008 | Dalal |
| 2008/0312625 A1 | 12/2008 | Hundorf |
| 2009/0131898 A1 | 5/2009 | Malmgren |
| 2010/0145295 A1 | 6/2010 | Isele |
| 2010/0305537 A1 | 12/2010 | Ashton |
| 2010/0310837 A1 | 12/2010 | Bond |
| 2011/0004180 A1 | 1/2011 | Fossum |

* cited by examiner

VOLUME EXPANDABLE SORBENT MATERIAL FOR CAPTURE OF ORGANIC FLUIDS AND SOLVENTS AND METHODS OF MAKING THE SAME

CROSS REFERENCE TO RELATED APPLICATIONS

This application claims priority to United States' provisional patent application Ser. No. 63/244,881, filed on Sep. 16, 2021, which is incorporated by reference herein.

TECHNICAL FIELD

This application relates to structures and methods for creating a reusable, absorbent foam material.

BACKGROUND

U.S. Pat. No. 5,260,345 discloses an aqueous-absorbent foam material, along with desirous characteristics for such materials for use in absorbing bodily fluids (e.g., the ability to retain absorbed liquids). United States Patent Publication 2005/0197414 describes a process for preparing polymeric foam materials, sometimes referred to as high internal phase emulsions ("HIPEs") that are characterized by open cell foams. Both of these documents are incorporated by reference, including any and all background description and information contemplated.

These synthetic materials, as well as others known in this field (e.g., naturally occurring materials, such as perlite, kenaf, bark, sawdust, and/or chicken feathers), can be useful in managing and disposing of unwanted fluids. The synthetics have found widespread adoption in consumer products like diapers, catamenial products, bandages, and the like. More generally, sorbents also find significant applications in the general housekeeping of industrial environments by improving safety for workers and preventing wider contamination.

An application of particular interest relates to collection and disposal of petroleum oils and related hydrocarbons. Requirements for sorbents of this nature include oleophilicity and oil retention, low density (buoyancy), high saturation, strength/durability, anti-fermentation in water (i.e., stable in sea water), low cost, and convenient storage and transportability (e.g., relatively compact, lightweight, heat and cold tolerant, etc.). Conventional oil-sorbent materials have been made from natural materials, owing to their low cost and abundant availability. However, natural sorbents suffer from issues like fermentation, efficiency (selectivity of oil over water), capacity and reusability. Synthetic polymer sorbents have been explored, including cellulose, polyurethanes (PU), polydimethylsiloxanes (PDMS), and melamines (all of which have improved selectivity and reusability), whereas carbon foams/sponges, chars, and carbon aerogels exhibit exceptionally high uptake capacities (up to 700 g/g) due to their low density.

All of the foregoing oil-sorbents exhibit sufficient gravimetric capacity for oil/chemical spill cleanup; however, enhancing the volumetric capacity (i.e., the ratio of the volume of liquid absorbed relative to the initial volume of the sorbent) of synthetic polymer sorbents would increase their utility in the field. The primary goal of some current approaches is to increase porosity, thus decreasing the density of the sorbents and increasing the amount of oil that can be absorbed. However, there is a practical limit to this approach. Even increasing sorbent porosity from 90% to 99.9%, a one-hundred-fold decrease in the sorbent relative density, only reduces the sorbent volume needed by 9.9% when cleaning the same amount of spill. In this case, applying even 99.9% porous sorbents would inevitably encounter great logistic challenges for storage and transportation of the large volumes of sorbent needed to clean up spills of low density organic solvents and petroleum products. Volumetric uptake capacity (volume absorbed/volume of the sorbent) deserves attention as an important criterion in developing new sorbent materials.

A few studies have reported high performance materials that take advantage of the ability of polymers to expand beyond their original volume due to swelling by a solvent (i.e., swelling) and/or by re-opening of collapsed pore structures (i.e., expansion). The swelling ratio depends on the crosslinking density, the solvent/sorbent interaction and the electrolyte concentration (if the sorbent is charged). Polyelectrolyte gels were synthesized by Ono as super absorbents for nonpolar solvents. The lipophilic polyelectrolyte gels show swelling ratio of 12 in hexane and 128 in dichloromethane. However, the swelling rate and mechanical properties of the gel were not discussed and it is not clear how to retrieve the absorbed solvent. A PDMS foam was prepared by Zhang using xylene as an inert diluent, showing a volumetric absorption capacity ratio of up to 5.5 in gasoline. Hainey describes an "ultrastructure" for poly-HIPE materials in which a toluene porogen is used to create spherical pores, although Hainey notes that the imbibition of various substances is difficult to predict owing to wettability and/or the possibility that internal expansion of the polymer matrix into small pores actually may cause a net reduction in space available for solvents.

A method for preparing oil-sorbents with high volumetric capacity, fast absorption rate, good oil selectivity and excellent recovery performance (i.e., ability to repeated expand and collapse the foam structure) is needed. Additionally, a sorbent with a porous structure that is retained in its compact state (low porosity) when dry, but expands to an intermediate state (recovery of the cellular structure) in a wetting but non-swelling solvent (e.g., silicone oil or methanol), and further expands in a swelling, and preferably hydrocarbon-based, solvent (e.g., heptane, toluene or chloroform) would be welcome. Such a sorbent could be employed in large-scale clean up of industrial accidents and other scenarios in which oils need to be absorbed and selectively separated from aqueous solutions and non-swelling solvents. Further still, a material having a volumetric capacity exceeding the volumetric capacity of conventional sorbents (i.e., less than 1.00) and, more preferably approaching a volumetric capacity greater than 20, that is also capable of swelling and expansion to accommodated the absorbed liquid would also be welcomed.

SUMMARY OF INVENTION

Highly porous, crosslinked polymer foams were synthesized using high internal phase emulsions (HIPE) as the template. The volumetric absorption capacity of the foams was enhanced by using an inert diluent in the HIPE continuous phase; a volumetric absorbing capacity of 15 ml/ml was achieved. The volumetric expansion of the compact foams is possible due to the relative forces associated with modulus of the polymer and the capillary force of the solvent during drying. The use of inert diluent enhances this effect by introducing nanopores in the strut walls by phase separation during polymerization. Control over the volumetric absorbency, oleophilicity, and ability to separate W/O emulsions is possible by varying the HIPE internal phase fraction and inert diluent concentration. The foams also exhibit good reusability and oil recovery capacity.

DESCRIPTION OF THE DRAWINGS

The appended drawings form part of this specification, and any information on/in the drawings is both literally encompassed (i.e., the actual stated values) and relatively encompassed (e.g., ratios for respective dimensions of parts). In the same manner, the relative positioning and relationship of the components as shown in these drawings, as well as their function, shape, dimensions, and appearance, may all further inform certain aspects of the invention as if fully rewritten herein. Unless otherwise stated, all dimensions in the drawings are with reference to inches, and any printed information on/in the drawings form part of this written disclosure, and all of the drawings pertain to the various aspects or embodiments of the inventive foams and methods of making the foam described herein.

DESCRIPTION

Figure 1A:
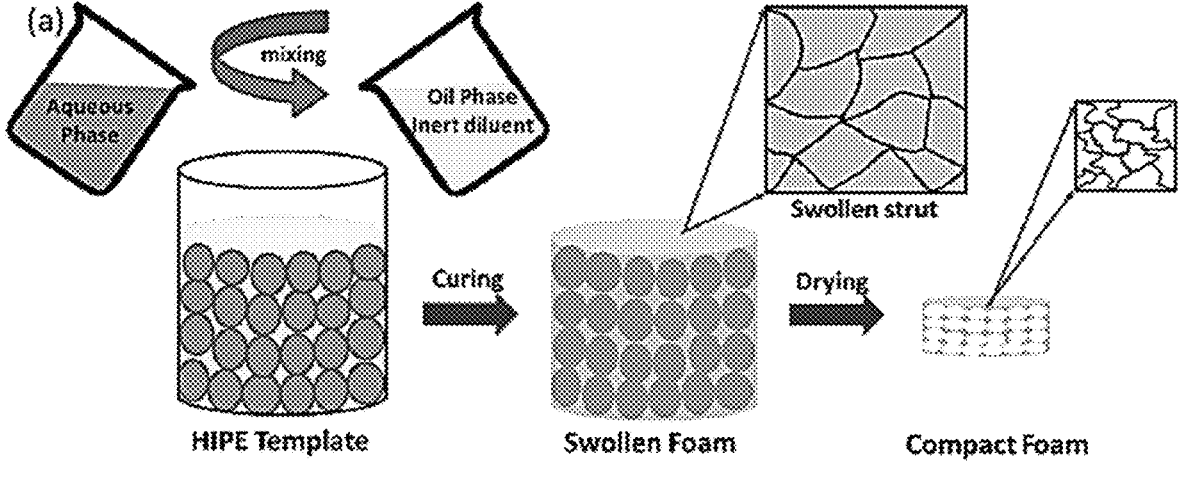
FIG. 1A is a schematic illustration of compact volume expandable structures relying upon a high internal phase emulsion foam preparation.

While specific embodiments are identified, it will be understood that elements from one described aspect may be combined with those from a separately identified aspect. In the same manner, a person of ordinary skill will have the requisite understanding of common processes, components, and methods, and this description is intended to encompass and disclose such common aspects even if they are not expressly identified herein.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

A primary goal of this research was to increase volumetric capacity (e.g., by enhancing porosity), thus decreasing the density of the sorbents and increasing the amount of oil that can be absorbed. However, there is a practical limit to this approach. Even increasing sorbent porosity from 90% to 99.9%, a one-hundred-fold decrease in the sorbent relative density, only reduces the sorbent volume needed by 9.9% when cleaning the same amount of spill. In this case, applying even 99.9% porous sorbents would inevitably encounter great logistic challenges for storage and transportation of the large volumes of sorbent needed to clean up spills of low density organic solvents and petroleum products. Volumetric uptake capacity (volume absorbed/volume of the sorbent) deserves attention as an important criterion in developing new sorbent materials.

Thus, oil-absorbing foams were prepared using high internal phase emulsion (HIPE) as a template. A non-reactive diluent (e.g., toluene) was introduced in the continuous oil phase as a way to impart the ability of the foam to expand significantly and to modify the surface roughness of the struts within the foam. The porous structure of the resulting foam remains in a compact state (low porosity) while dry, expands to an intermediate state (recovery of the cellular structure) in a wetting but non-swelling solvent (e.g., silicone oil or methanol), and further expands in a swelling solvent (e.g., heptane, toluene or chloroform).

Throughout this disclosure, the labeling convention RxxTxx was used. R denotes the total weight ratio of aqueous phase to oil phase, while T denotes the weight concentration of non-reactive diluent (e.g., toluene) in the oil phase. For example, R19T40 stands for a foam made from a 19 to 1 water to oil ratio emulsion and 40 wt. % toluene in the continuous oil phase. In a few cases the emulsions were sheared for a longer time prior to polymerization to affect the microstructure of the emulsion. In these cases, the samples were coded as RxxTxxMxx, with M indicating the total mixing time in minutes. Adding the inert diluent did not affect the stability of the emulsions over the time scale of the foam preparation process.

FIG. 1a illustrates the three steps of compact volume expandable sorbent (CVES) fabrication: emulsification, curing, and washing/drying. After drying, there is no need for further chemical treatment and the CVES is ready for use. Increasing the inert diluent concentration has limited influence on the HIPE stability, but it has a significant effect on the HIPE curing step. R19T80 samples are not stable as can be seen by the large amount of free water at the bottom of the tube.

In a representative emulsion preparation procedure, the continuous oil phase consists of monomers 2-ethylhexyl acrylate (EHA), 2-ethylhexyl methacrylate (EHMA) and ethylene glycol (EGDMA) as crosslinker in a ratio of 40:40:20. Emulsifiers for high internal phase emulsion preparation were polyglycerol succinate (PGS) and cetrimonium bromide (CTAB). Then inert/non-reactive diluent toluene was added into the monomer mixture and, finally, the emulsifiers (PGS:CTAB=10:1) were dissolved into the mixture.

In order to exemplify certain aspects of the invention, the toluene concentration in the oil phase may vary from 0.1 to 80% by weight while the emulsifier concentration was maintained at about 6% by weight for all samples. Overall, 19 parts of aqueous phase consisting of 2 wt. % NaCl and 0.3 wt. % NaPS were added dropwise into one part of previously prepared oil phase over 2.5 min followed by mixing for an additional 1 min. The emulsions were then transferred to 50 ml centrifuge tubes and cured at 65° C. for 24 hr. After polymerization, foams were cut into cylindrical discs and washed with distilled, deionized (DI) water and isopropyl alcohol (IPA) for 12 hr.

Separately, solid polymer preparations are also needed. Here, the solid polymers may prepared from the same oil mixture as was used in the preparation of the foams. Consistent with the illustrative example noted above, 0.5 wt. % benzoyl peroxide was added to the oil mixture as initiator. This mixture was then cured in glass tubes in an oil bath at 85° C. for 4 hr.

The expansion behavior of dry foams prepared above was studied using cyclohexane as the oil/hydrocarbon to be absorbed. Foams were placed in a beaker containing the solvent then transferred to a vacuum chamber until the foam sank to the bottom. Applying vacuum ensures that the foams were fully saturated with liquid with no air trapped inside. The foams were found to expand instantly (in a few seconds) after wetting by the solvent but the volume of the foam was found to barely increase afterward. The beaker was sealed by aluminum foil and left undisturbed for 2 hr before observation. The weight and dimensions of the foam were measured before and after the expansion, and the expansion ratio was calculated as:

$$\text{Expansion ratio} = \text{Foam Volume}_{wet}/\text{Foam volume}_{dry} \quad (1)$$

The swelling behavior of solid polymers was also investigated using the same procedure as the foam except that the swelling ratio was measured by a gravimetric method. The polymers were cut into 5 mm pellets and kept in the solvent for 48 hr to ensure good swelling. Then the pellets were filtered in a Buchner funnel for 10 s and weighed immediately. Such a fast filtration step ensures there is limited (if any) solvent trapped in between the pellets and with little solvent loss due to evaporation.

Separately, foam compaction was also studied. Samples were prepared according to a fixed volume of emulsion, as above. DI water and IPA Soxhlation, and drying at a 60° C. oven overnight, foam volumes were measured. The shrinkage of the foams upon drying is gauged in terms of the compaction ratio defined as:

$$\text{Compaction ratio} = \text{Emulsion volume}/\text{Foam volume}_{dry} \quad (2)$$

The internal structure and morphology of the foams may be characterized by FESEM (Field Emission Scanning Electron Microscopy, FEI Helios 650). The samples were sputter-coated with gold 5 nm thick before SEM observation. Various magnification micrographs (from 200× to 20,000×) were taken for observation of foam void, window and strut surface morphology. The 500× micrographs were processed with Image) to analyze foam window size distribution since this magnification normally generated a good sample size (over 1000 windows). The area-averaged diameter was used to represent the window size and a factor of $\sqrt{\pi}/2$ was adopted for correcting for the viewing angles of the window around a void surface.

The mechanical characteristics of the foams under uniaxial compression (e.g, via Instron 101) may also be characterized. The impact of the diluent on foams stress-strain behavior was studied in both dry and swollen state. Each foam was tested for 5 consecutive cycles. Each cycle consists of loading the foam to 75% strain followed by unloading the strain at the same strain rate. Hysteresis loss was calculated as the ratio between the area inside the hysteresis loop and the area under the loading cycle:

$$\text{Hysteriesis loss rato} = \text{area of hysteresis loss/area under loading curve} \quad (3)$$

Both the advancing and receding contact angle measurement were carried out on a DataPhysics optical contact-angle measurement and contour-analysis system. The advancing contact angle for water was imaged during the process of slowly increasing the volume of a standing droplet from 3 to 10 μl. The receding contact angle was measured during the slow withdrawal of water from a standing droplet with initial volume of 15 μl. The data was collected from three positions for each sample and was averaged over three samples. The contact angle measurement was performed on both foam and samples of the solid (unfoamed) polymer.

The absorption capacity of the foams was measured by placing the foam into the organic liquid. After 2 hr, the foam sample was removed and left in air for 30 s to allow liquid attached to the surface of the foam to drain away. The dimensions and weight of the sample were 8 measured before and after the sorption. The gravimetric (Cg) and volumetric (Cv) capacities were calculated according to (where $m_w$ and $m_d$ represent the weight of wet and dry foams, $V_s$ and $V_d$ represent the volume of the absorbed solvent and dry foams, and $\rho_s$ and $\rho_f$ represent the density of the solvent and dry foam):

$$C_g = \frac{m_w - m_d}{m_d} \quad (4)$$

$$C_v = \frac{V_s}{V_d} = \frac{(m_w - m_d)\rho_f}{\rho_s m_d} \quad (5)$$

The performance of the foams over multiple absorbance cycles was also examined. Dry foams were placed in heptane until saturated and then the foams were placed in a Buchner funnel and then by an elastic film. The absorbed heptane was squeezed out of the foams by applying vacuum (−25 in Hg) to the funnel which causes the elastic film to compress the foam. This cycle was repeated 10 times consecutively to examine the durability and reusability of the foams. The sorption capacity is reported normalized to the maximum sorption capacity, defined as the gravimetric capacity of heptane absorption after 2 hr of soaking.

Figure 1B:
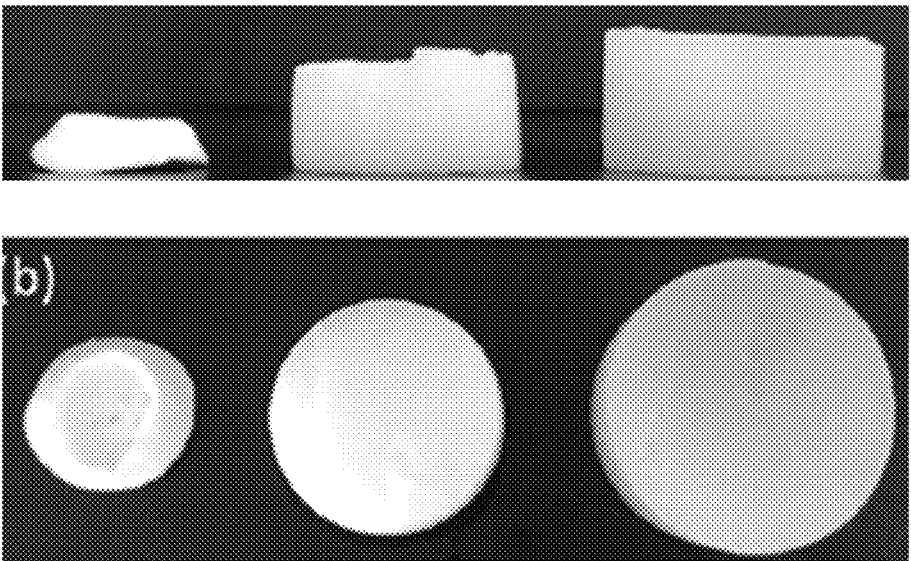
FIG. 1B is a photograph of foam R19T60 in compact state (left), volume expansion in methanol due to recovery of collapsed cellular structure (middle) and in heptane due to further swelling of the strut (right)

For the absorption tests, only R19T0 to R19T60 were further investigated as these samples showed good stability during the curing process as well as good mechanical integrity. The presence of inert diluent in the emulsion has a direct impact on the free radical crosslinking copolymerization process. By altering the crosslinking condition of the elastomer, the diluent concentration will affect the foam morphology, swelling behavior, mechanical properties, and most importantly the volume expansion behavior as shown in FIG. 1*b*. Thus, an important parameter within this study is the concentration of inert diluent used in the formulation of the polyHIPE foam.

Although not intending to be limited as such, pursuant to classical theory, the swelling process is a competition between the mixing free-energy of polymer chains with the swelling solvent and the elastic free-energy of the polymer network. The denser the polymer chains are crosslinked, the lesser the swelling due to the greater elasticity needed to balance the mixing of solvent and polymer chains. The relationship between swelling ratio and crosslinking density as described by Flory and Rehner according to:

$$-\ln(1-v)+v+\chi v^2 = V_s N(v^{1/3}-v/2) \tag{6}$$

where N is the crosslinking density (mol/m³), v is the polymer volume fraction in the swelling network or inverse of volume swelling ratio, $\chi$ represents the interaction parameter and $V_s$ is the molar volume of the solvent.

Figure 1C:
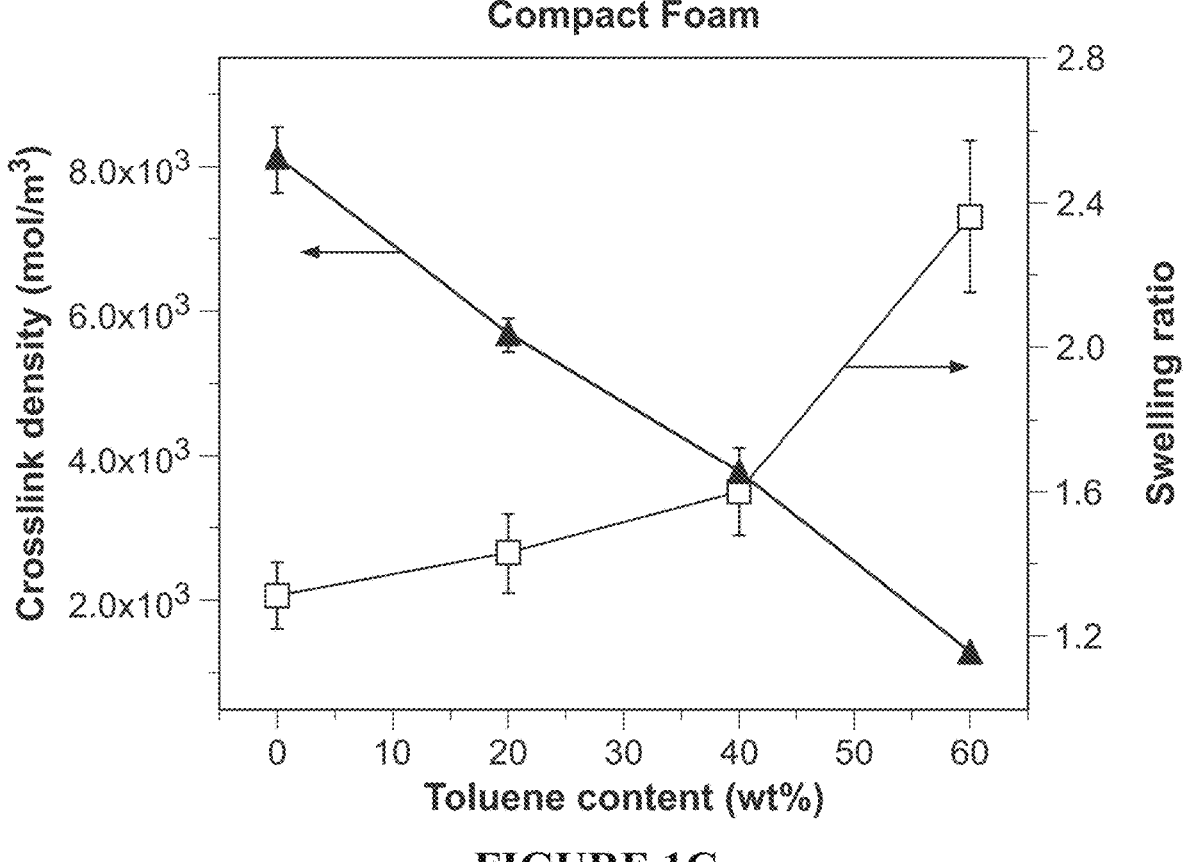
FIG. 1C is a graphic showing the swelling ratio and cross-linking density with toluene content in the oil phase, all according to certain aspects of the invention.
Figure 2:
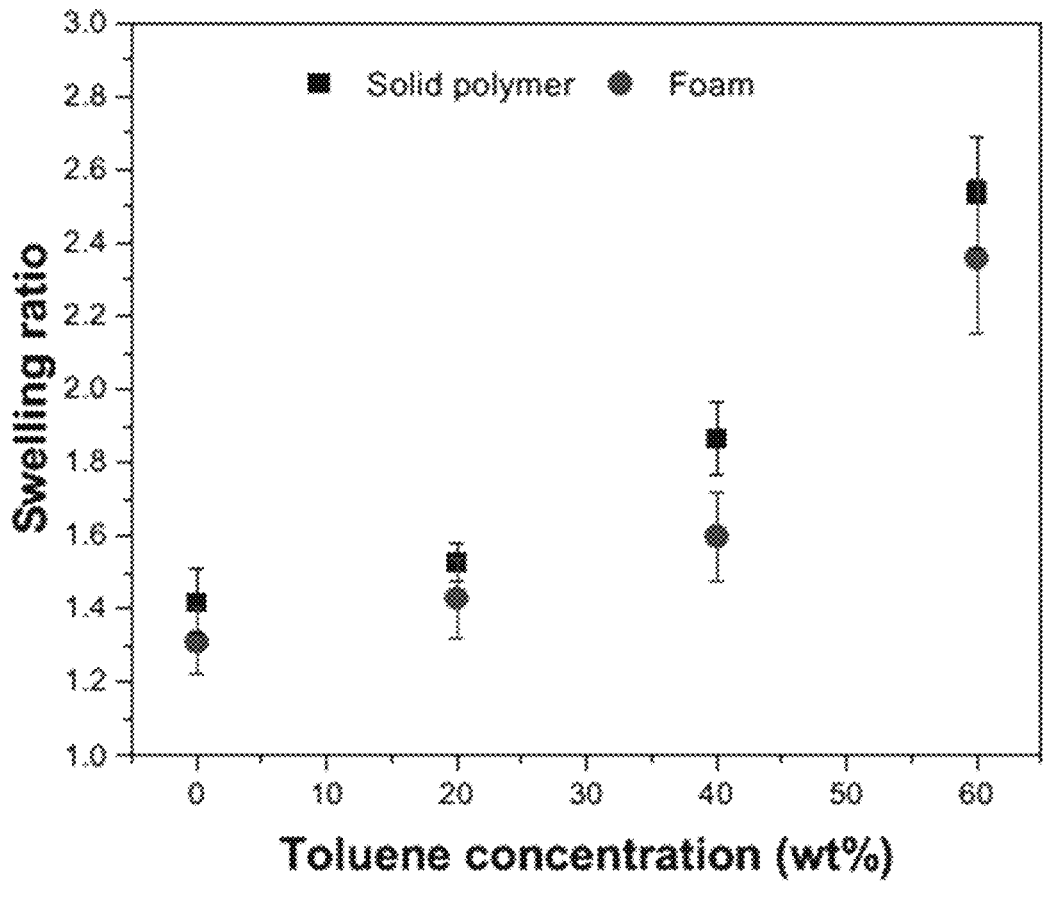
FIG. 2 is a graph showing swelling behavior of foams and solid polymer with/in cyclohexane.

The swelling ratio with cyclohexane as well as the crosslinking density for the foams were calculated from the Flory-Rehner theory as a function of diluent concentration and are plotted in FIG. 1C. The solid polymer swelling behavior is shown in FIG. 2. It was found that the greater the inert diluent content, the greater the swelling ratio and the smaller the crosslinking density. The foam swelling ratio stays very close to (but slightly lower than) that of the solid polymer indicating the similarity between two materials. During the free radical crosslinking copolymerization (FCC) in the continuous oil phase, the presence of an inert diluent serves as a swelling agent for the reacting monomers. As the polymer network grows, the unreacted monomers and diluent molecules are absorbed in the swollen network such that the overall composition remains similar to the initial state. At the same time, the crosslinking density decreases with increasing diluent concentration due to the decrease in polymer volume fraction as well as intramolecular cyclization as pointed out by Dusek. Such a swollen network will continue growing until the point of phase separation. In the phase-separated state, there coexists a solvent (diluent) rich phase with dissolved oligomers and a swollen crosslinked network phase.

Figure 3:
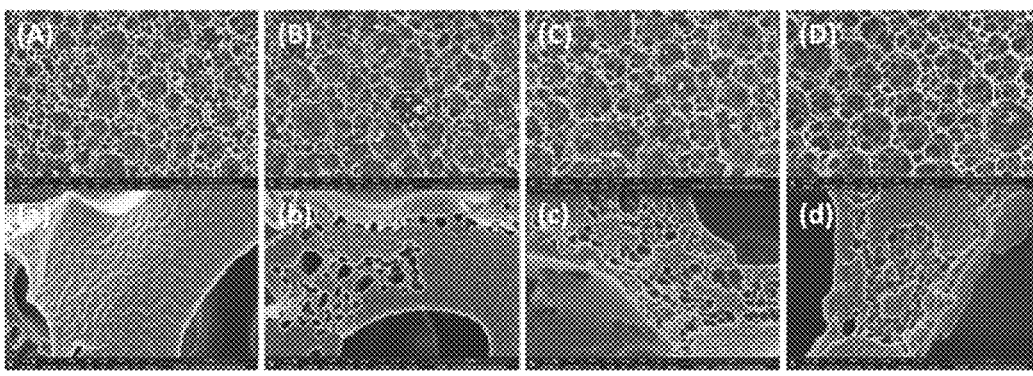
FIG. 3 are a series of comparative, microscopic photographs showing the void/window morphology (500×) in the top row labeled (A) through (D), and strut morphology in the bottom row labeled (a) through (d), all for foams prepared with diluent (toluene) concentration of: (A,a) 0%; (B,b) 20%; (C,c) 40%; and (D,d) 60%.

The porosity of the swollen network depends on the amount of diluent and crosslinker. If a porous morphology forms, the size of the pores (from 10 Å to 1 µm) depends on the solvation power of the diluent and the glass transition temperature of the polymer. The pore volume increases as the diluent content increases. In this work, the inert diluent promoted phase separation during the FCC process. FIG. 3 shows the micro-morphology of the struts characterized by high magnification FESEM. The control sample R19T0 (which contains no diluent) has a rough solid strut surface topology which is typical for polyHIPE foams. As the diluent concentration increases in the oil phase, the solid strut surface is transformed into a porous morphology with pores on the order of 50 nm. Increasing the concentration of the diluent does not affect the size of the nanopores, but does increase their number density within the struts. The presence of such nanoporous morphology in the strut affects the wetting properties of the foams.

Figure 4A:
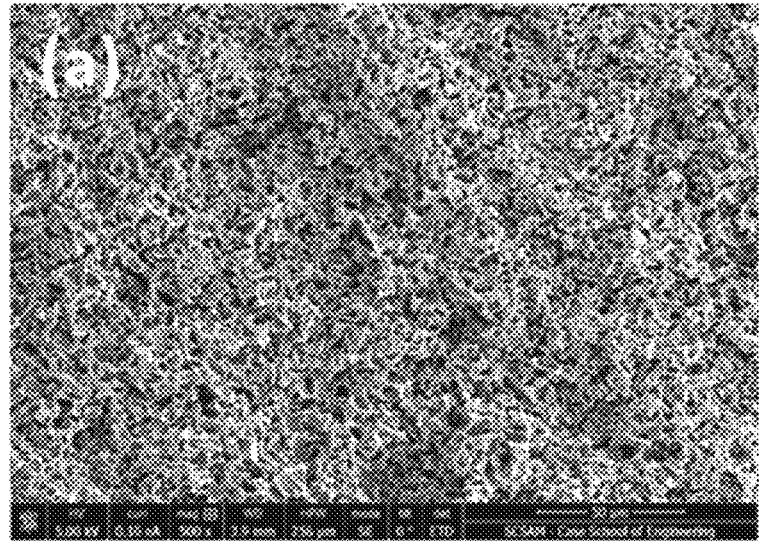
FIGS. 4A and 4B are comparative microscopic photographs showing the foam in the collapsed/dry form (FIG. 4A) and in its expanded/swollen form (FIG. 4B).
Figure 4B:
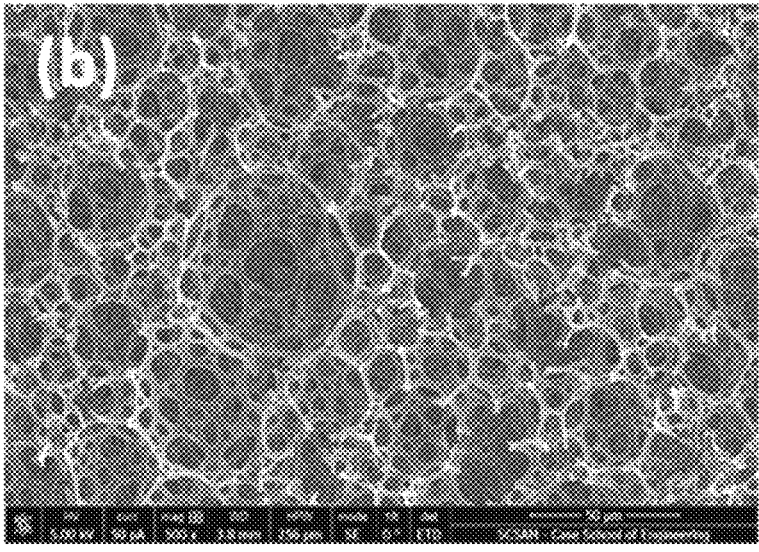

FIGS. 4A and 4B provide further visual evidence of the microstructure as the foam collapses and expands. In its collapsed stated, the pores form condensed, irregular shapes, whereas the expanded state exhibits large, regular, and well formed structures. The ability to cycle between these states repeatedly without degradation of either structure (collapsed or expanded) facilitates the foam's ability to perform the various functions contemplated herein.

The control of crosslinking by the inert diluent also has a significant impact on the mechanical properties of the foam and indirectly affects its macroscopic morphology via volume shrinkage. The compression behavior of the foams can also be discerned from FIG. 2. For porous materials, mechanical properties depend on the strut material (polymer material) and the relative density of the foam. The scaling relationship between the mechanical properties of the foam and that of the material comprising the struts was proposed by Gibson and Ashby:

$$\frac{E_f}{E_s} = C\left(\frac{\rho_f}{\rho_s}\right)^2 \tag{7}$$

where E and p represent the compressive modulus and density respectively, subscripts f and s stand for foam and strut, and C is a fitting constant. This model predicts that the foam modulus scales linearly with the strut modulus and quadratically with relative density.

The Gibson and Ashby model predicts the mechanical behavior foams prepared without diluent quite well. In the swollen state, the foams show a significant drop in compression modulus compared with the dry state. Meanwhile increasing the diluent concentration causes a gradual decrease in the foam modulus in both the dry and swollen states. As discussed previously, the inert diluent will cause a decrease in the crosslinking density in the strut, which is expected to lead to a reduction in the compressive modulus of the foam.

Figure 5A:
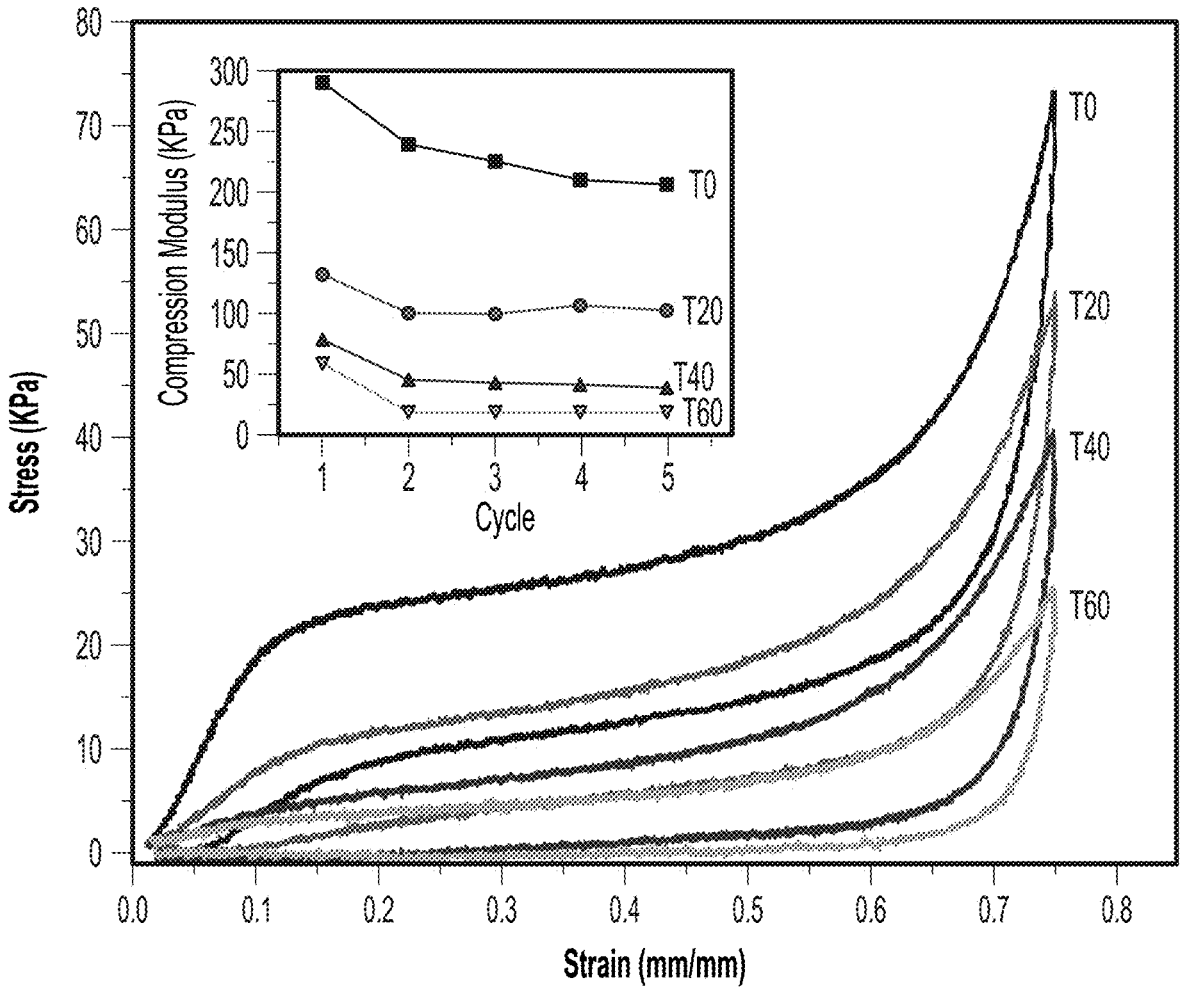
FIGS. 5A and 5B are graphical plots showing the loading/unloading compression stress-strain curves for, respectively speaking, (a) dry foams and (b) in the swollen state. The inset in the upper left of each graph show the compression modulus for the five consecutive cycles.
Figure 5B:
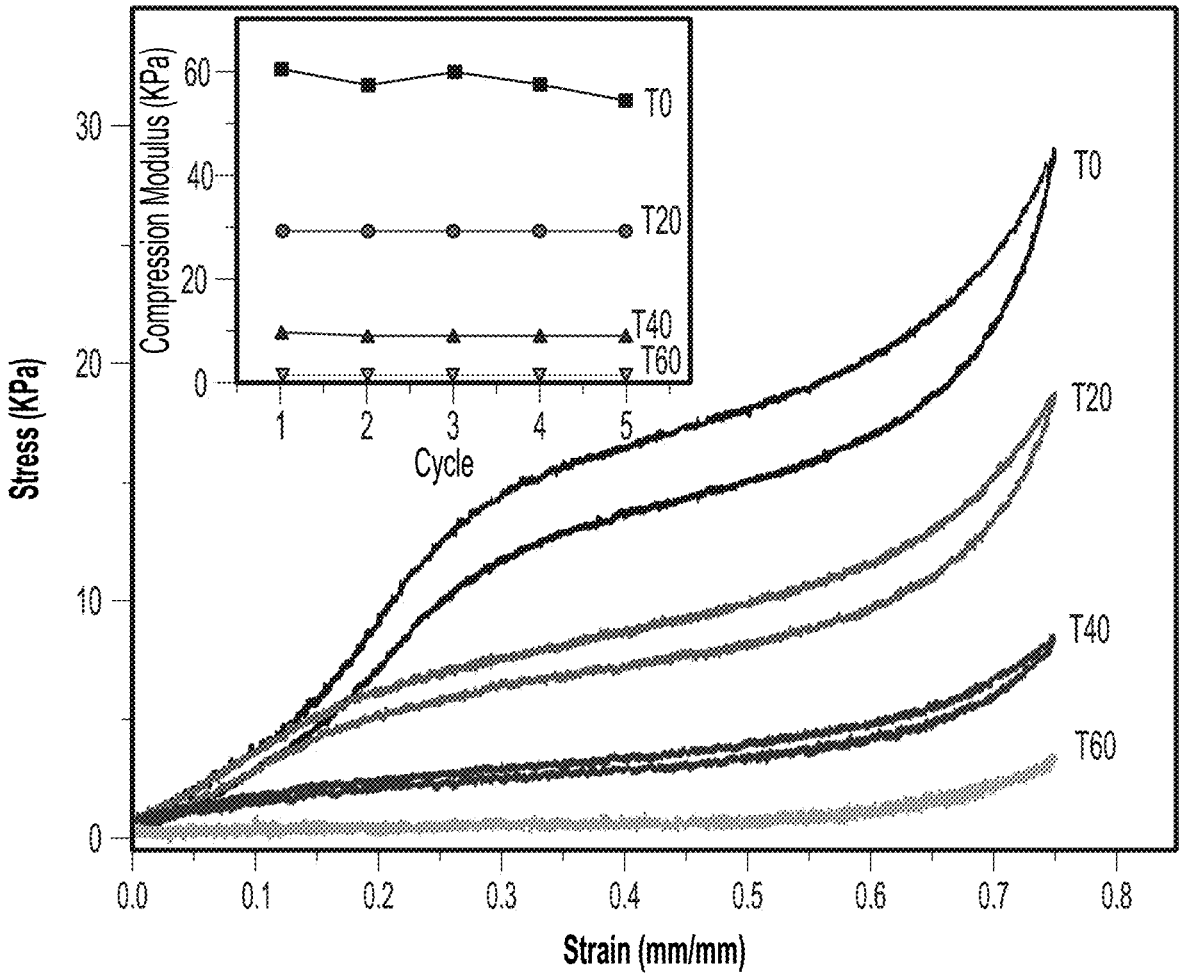
Figure 6:
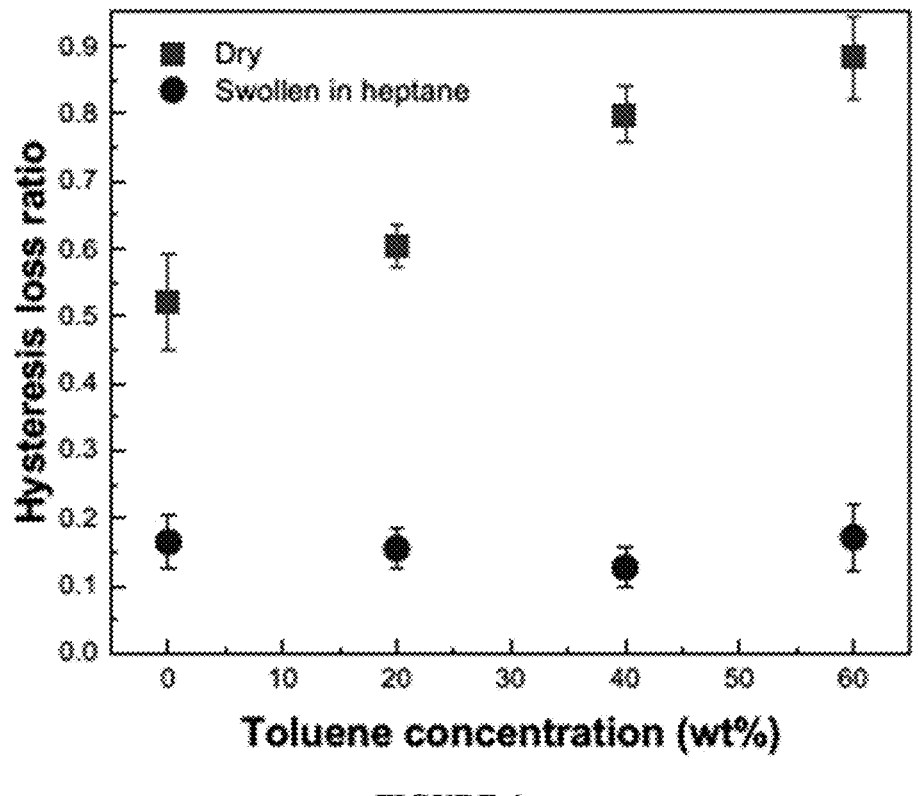
FIG. 6 is a graphical plot showing hysteresis loss ratio for dry and swollen foams in the loading and unloading compression cycle.

Hysteresis behavior is observed in the stress-strain curve for both dry and swollen foams as shown in FIG. 5*a* and FIG. 5*b* respectively. The hysteresis loss indicates the energy dissipated during the loading/unloading cycle and its magnitude is plotted in FIG. 6. Compression hysteresis is common for rubbery materials due to their viscoelastic nature. The smaller the hysteresis loss, the less energy is lost due to internal polymer chain friction. Since the foams were prepared with the same dimensions and were compressed at the same strain rate, the change in the hysteresis loss is attributed to the change in crosslinking density within the foams. In the dry state, the hysteresis loss was found to increase with diluent concentration. As the diluent concentration was increased, the molecular weight between crosslinks increases. This results in an increased viscous energy dissipation during the loading and unloading cycle due to the internal friction between the polymer chains as they are being deformed. However, in the swollen state, the hysteresis loss is found to be significantly smaller than the dry state, indicating a great decrease in the energy dissipation during deformation which can be attributed to the polymer chains being in a stretched state. In contrast to the dry state, the hysteresis loss is identical within the range of uncertainty of the measurement. This result can also be attributed to the fact that the network is swollen and extended such that under the strain rate used in this study, it is difficult to detect the small variation in the hysteresis loss. After five cycles of loading/unloading, the swollen foams exhibit a good recovery in terms of compression modulus while the dry foams suffer a gradual loss in the mechanical modulus.

Figure 7:
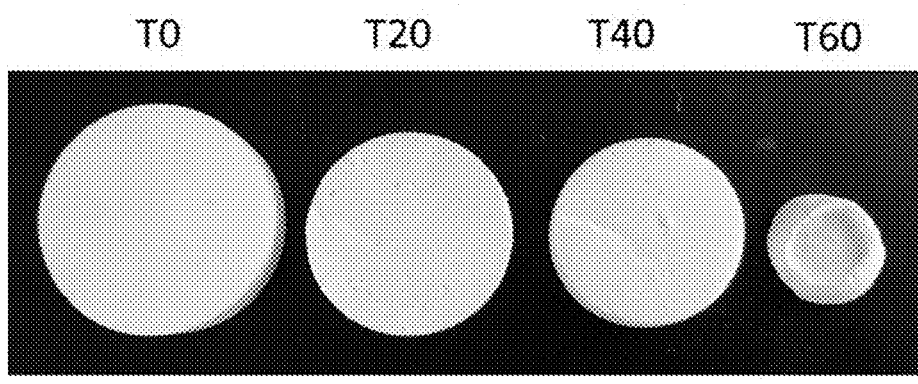
FIG. 7 includes photographs depicting volume reduction of foam by increasing diluent content seen in dried samples. The diameters of all samples prior to drying were identical.

FIG. 7 shows the gradual volume reduction upon drying for the R19T0 to R19T40 samples and pronounced shrinkage for the R19T60 sample. Compaction ratios are presented in Table 1. The volume reduction phenomena can be explained by two mechanisms: shrinking of the struts and collapse of the cell structure within the foams. As the toluene is replaced by a non-swelling solvent (like methanol or water), the porous struts first shrink due to de-swelling. Upon drying, the nanopores on the struts further collapse due to the negative capillary pressure as solvent leaves the pores. Since the polymer is in the rubber state and the struts have relatively low porosity, the nanopore morphology will be recovered when the foams are fully dried.[31] For R19T0 to R19T40 foams, the bulk density was only found to slightly decrease with increasing diluent concentration, which is consistent with an increasing porosity of the struts. Similar to the collapsing of nanopores within the struts, solvent leaving the voids will again exert a negative pressure to the foam. The competition of such a pressure and the compression modulus of the foam determines the overall collapse of the structure. When the compression modulus is larger than such negative pressure, the foam's overall structure will remain intact. For a sufficiently low compression modulus, the foam will collapse upon drying. This negative pressure, as can be estimated by capillary pressure in Equation 8, scales with the liquid surface tension and inversely with the capillary radius:

$$P \sim \frac{2\gamma}{r} \quad (8)$$

where $\gamma$ represents the liquid surface tension and r represents the capillary radius. In the case of the polyHIPE foams, the capillary radius corresponds to the radius of the interconnecting windows. In the scenario of drying a foam soaked with IPA ($\gamma$=20 mN/m), based on Equation 8, the estimated capillary pressure is in the range of 3.1~4.7 kPa for the foams in this work which have a characteristic capillary diameter in the range of 8.4~13.0 μm. From the mechanical properties as listed in Table 1, the compression modulus for swollen foams decreases from 60.4 kPa for R19T0 to 1.5 kPa for R19T60 which falls below the range of capillary pressure, causing the collapse of R19T60 structure. This collapse in the macroscopic cellular structure will enable the foam to achieve a compact state, without the need to apply any external forces to achieve compaction. Once such a compact foam contacts common petroleum fuels or swelling solvents, it will expand to its original cellular structure in a matter of seconds. Such a compact-expansion-swelling mechanism is fully reversible between drying and swelling cycles, and the initial collapse of the structure allows for a great volume reduction of such foams for efficient storage and transportation.

The surface energy of the foam material was measured using Fowkes' theory with the two-liquid method using water and methylene iodide. The polymer contact angle with these two liquids and the calculated surface energy are listed in Table 2. The surface energy is calculated to be 32 mJ/m$^2$ for the crosslinked polymer material. It is much lower than 73 mJ/m$^2$ of water and higher than most hydrocarbon oils and solvents. Thus in theory, water will not wet the foam while oils are able to completely wet the foams. PolyHIPE foam wettability is characterized by both water and oil contact angles. The oil chosen for the characterization is a PDMS oil because it does not swell the foam materials. The oil sessile drop spreads quickly on the solid material and is sucked into the foam immediately upon contact, which is a good indicator of the oleophilicity of the foam materials.

TABLE 2

Comparison of surface energies.

| Material | Contact angle with foam | Surface tension (energy)/mJ/m |
|---|---|---|
| Water | 100 | 73 |
| Methylene iodide | 30 | 50 |
| Foam material | NA | 32 |

Figure 8:
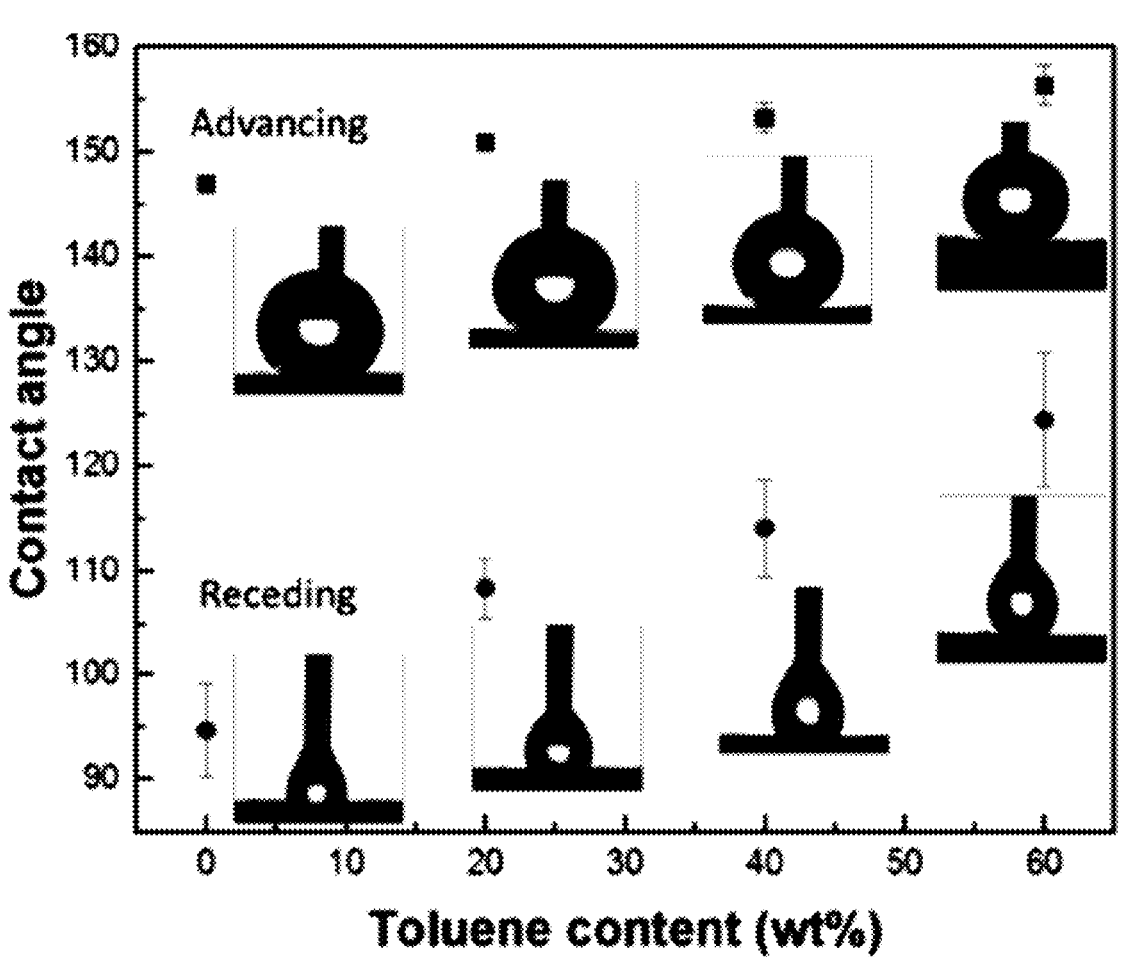
FIG. 8 is a graphical plot showing the effect of contact angles in comparison to the absorbed oil/fluid, based upon weight percentage. The inset image is a scanning electron micrograph of the strut surface at associated with each datapoint.

FIG. 8 shows the advancing and receding water contact angle of all the foams prepared. The advancing contact angle for solid polymer and undiluted foam R19T0 are 100° and 145° respectively. However, the contact angle hysteresis (CAH) is first enlarged from solid (CAH=30°) to R19T0 (CAH=52.3°). The increase in both the advancing and receding contact angle is due to the trapped air in the porous foam and decrease in the three phase contact line from the windows which cut open the continuous struts. The increased contact angle hysteresis can be explained as the increased friction pinning of the contact line during volume shrinking. For the foams prepared with toluene, the advancing contact angle increased from 1450 to 155° while the receding contact angle increase from 950 to 125°.

As seen from the SEM micrographs, the strut surface shows grain-like roughness which also can be found in R19T0 sample. Also seen are the pores in the nanoscale emerged from the phase separation due to toluene. It has been reported that the hierarchical scale in the surface morphology will decrease the energy barrier for the contact line to move which makes the depinning of the receding three phase line easier, thus increase the receding contact angle and a decrease in the contact angle hysteresis.

TABLE 1

Foam physical properties

| Foam code | Bulk density (mg/cm$^3$) | Porosity (%) | Compaction ratio | Compression modulus dry (kPa) | Compression modulus swollen (kPa) | Window size (μm) |
|---|---|---|---|---|---|---|
| R19T0 | 51.0 ± 0.2 | 95.2 ± 0.1 | 1.1 ± 0.1 | 291 ± 42 | 60 ± 6 | 8.4 ± 0.1 |
| R19T20 | 47.0 ± 0.3 | 95.5 ± 0.1 | 1.2 ± 0.1 | 133 ± 21 | 30 ± 2 | 8.6 ± 0.6 |
| R19T40 | 44.0 ± 0.5 | 95.8 ± 0.1 | 1.5 ± 0.1 | 77 ± 10 | 9 ± 2 | 11.7 ± 1.0 |
| R19T60 (Freeze dried) | 42.0 ± 0.2 | 96.0 ± 0.1 | 1.9 ± 0.1 | 61 ± 5 | 1.5 ± 0.2 | 13.0 ± 0.1 |
| R19T60 (compact) | 405 ± 42 | 61.4 ± 2.6 | 18.2 ± 0.8 | NA | NA | NA |

To prove that the foam is both oleophilic and hydrophobic, experiments were performed in which dry foam was kept at the bottom of a beaker containing DI water with a layer of heptane floating at the upper surface. When the foam contacted only water, the internal surfaces of the foam remained dry and water was prevented from entering the foam by the trapped air. The foam also maintains its original volume. After releasing the foam and allowing it to float up and contact the heptane, a rapid absorption of the heptane (but not water) occurred. This was simultaneously accompanied by a significant expansion in the volume of the foam, allowing it to absorb a volume of heptane several times the original volume of the dry foam.

Figure 9A:
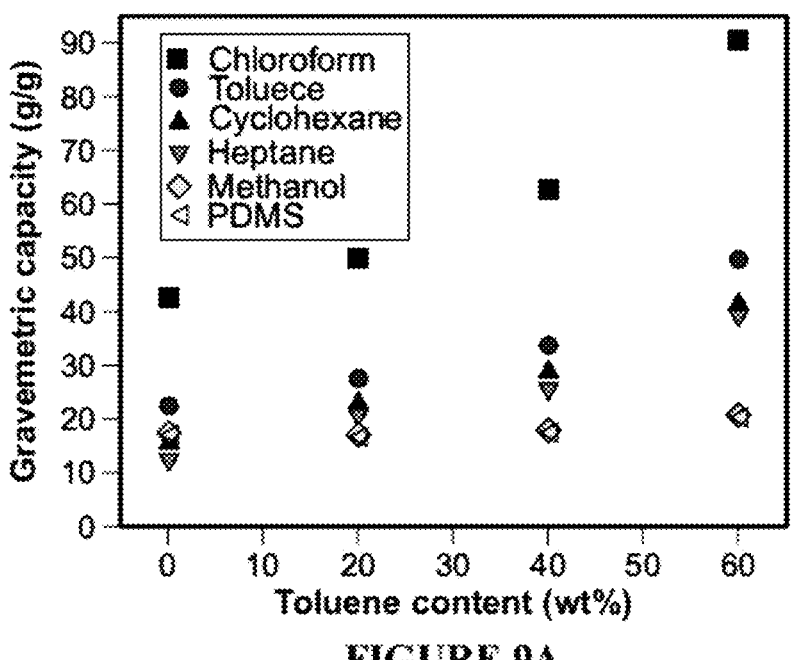
FIGS. 9A and 9B are, respectively speaking, graphical plots of the gravimetric capacity and volumetric capacity of various solvents by foams with increasing inert dilution content.
Figure 9B:
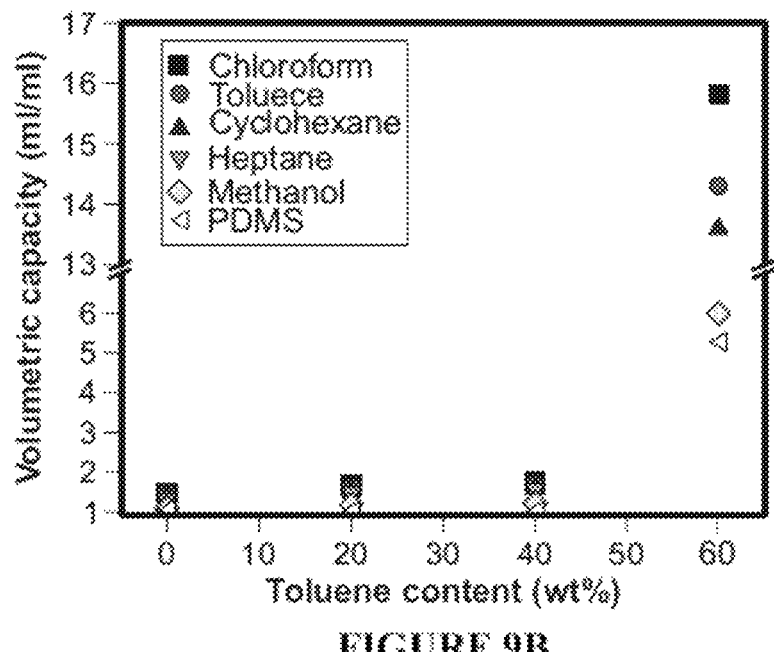

PolyHIPE foam absorption was evaluated for both gravimetric (g/g) and volumetric capacity (ml/ml) for various solvents. If the porous sorbent maintains a fixed volume, its gravimetric capacity is affected by the liquid and sorbent density, the lighter the foam or the heavier the liquid is, the larger the gravimetric capacity will be. Correspondingly, the volumetric capacity is only affected by how much available pore space was filled by the liquid. Thus, while the reported gravimetric capacity is often in the order of hundreds, the volumetric capacity is close to unity in the best scenario (when it is fully saturated with the liquid) and often less than one when not fully saturated. However, when the porous foam can expand its volume, both the gravimetric and volumetric capacity will increase with the degree of volume expansion. Both the gravimetric and volumetric absorption capacity for R19T0-R19T60 foams are plotted in FIG. 9*a* and FIG. 9*b* respectively.

For absorbing a non-swelling solvent like methanol and PDMS, the gravimetric and volumetric capacity is slightly less than 19 g/g and 1 ml/ml respectively for all foams. The increase in volumetric capacity for R19T60 sample is due to the expansion of the collapsed macroscopic voids. When absorbing a good solvent capable of swelling the foam materials, the strut volume will expand leading to a macroscopic expansion of the foam. For those solvents studied, the order of the ability of the solvent to swell the foam increases in the following order: PDMS, methanol, heptane, cyclohexane, toluene and chloroform. The Hansen solubility parameter[36] for the solvents as well as the foams material are listed in Table 3. Methanol and PDMS are the furthest from the foam materials, while the solubility parameters for the other solvents range from 15.3 $MPa^{1/2}$ to 19 $MPa^{1/2}$, and in the range of the solubility parameter for the foam, calculated by group contribution theory to be 16 $MPa^{1/2}$. Chloroform was best able to swell the foams. This may be caused by the less bulky chemical structure compared with the other solvent molecules and therefore may more easily diffuse into the crosslinked polymeric network.

TABLE 3

Hansen solubility parameters of materials used in this study.

| Materials | Hansen solubility parameter ($MPa^{1/2}$) |
| --- | --- |
| Foam material | 16 |
| Heptane | 15 |
| Cyclohexane | 17 |
| Toluene | 18 |
| Chloroform | 19 |
| PDMS oil | 21 |
| Methanol | 30 |

When comparing foams that were made with different toluene content, the volumetric capacity gradually increases as the inert diluent content increases from 0 to 60 wt. % in the oil phase. In the case of R19T60, the volumetric capacity is the highest at about 15 ml/ml. As discussed in the previous section, swelling increases due to the decrease in crosslinking density from samples R19T0 to R19T60. Besides the volume expansion due to swelling, the expansion from the macroscopically collapsed state further increases the volumetric capacity.

Figure 10:
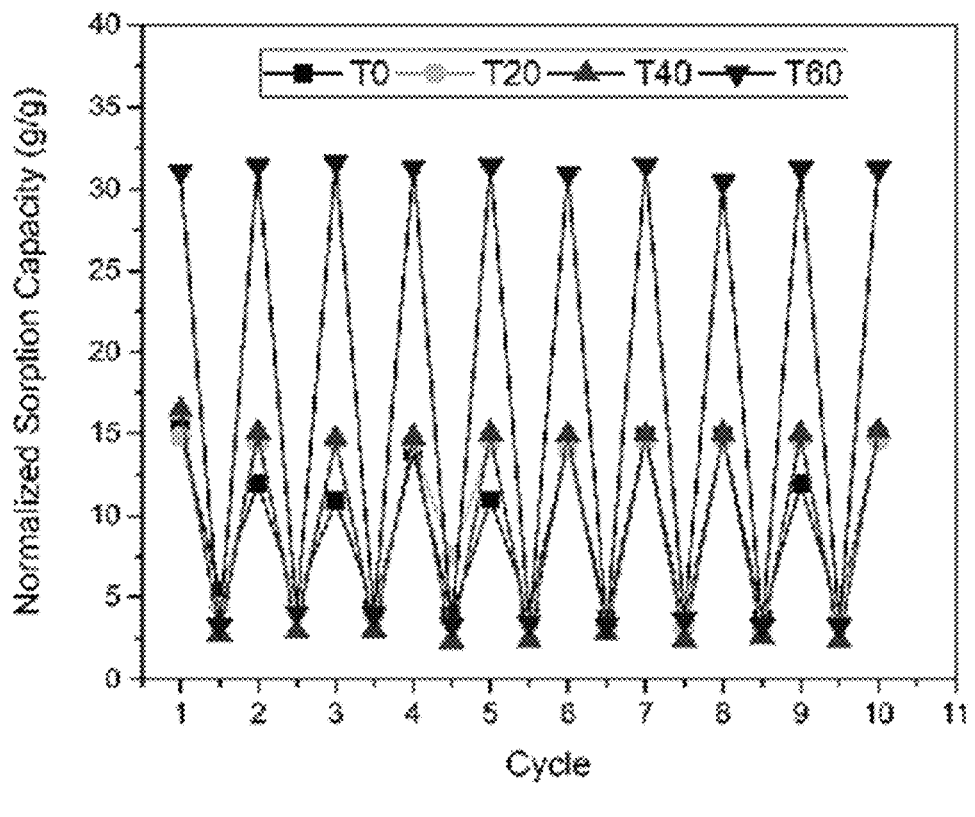
FIG. 10 is a graphical plot of the absorbance capacity of foams over ten cycles of absorption and squeezing with heptane.

FIG. 10 demonstrates the uptake capacity over 10 absorbing-squeezing cycles. Over the cycles, the absorbance capacity is stable for all samples. Some solvent remains in the foam after the squeezing, but this amount will be the same throughout all of the cycles. The difference between the high and low peaks in FIG. 10 represents the amount of solvent that can be recovered in each cycle. While the values for samples R19T0-R19T40 stay in the same range at 15 g/g, T60 has the highest recovery value at 30 g/g. The increased recovery capacity from R19T0 to R19T60 indicates a significant increase in the amount of solvent which can be recovered within each cycle. Moreover, the uniform capacity over 10 cycles demonstrates the good reusability of the foams under loading-unloading operation.

While toluene is identified as a non-reactive diluent of particular interest, any material that retains structural integrity and handleability of the foam to generate capillary pressure during drying (so as to collapse the structure of the foams into a compact state) would suffice. Such diluents must also be miscible in the oil phase of the emulsion without participating in the polymerization reaction. Finally, comparatively low boiling points (such as those exhibited by hexane, cyclohexane, xylene, etc.) may be preferred.

Any variety of polymers that can be fashioned into polyHIPEs so as long as their precursor monomers can be used as the continuous phase of the emulsion. Acrylate monomers appear to be particularly promising, but foregoing aspects could be applied to styrene-based polymers, as one further example. Ultimately, the key is to find the right combinations of surfactants (to stabilize the emulsion) and initiator for the polymerization reactions that lead to open-celled foams.

Other analytical techniques and instruments may be used to further characterize aspects of the invention. Also, the identification of specific molecules and chemical structures is exemplary, and minor alterations in chain length or inclusion of small, non-reactive, and/or common functional groups—including the substitution of well known, similar materials—are embraced by the teachings of this disclosure.

In closing, the advantages of the present invention in comparison to previously known materials and methods include its ability to self compact, so as to eliminate the need for mechanically compressing and/or binding the foam in its non-absorptive state. Further, this invention exhibits superior ability to selectively absorb only oils while simultaneously rejecting significant amounts of water (in some embodiments, substantially all water is precluded from the foam, meaning it absorbs only oils).

Although the present embodiments have been illustrated in the accompanying drawings and described in the foregoing detailed description, it is to be understood that the invention is not to be limited to just the embodiments disclosed, and numerous rearrangements, modifications and substitutions are also contemplated. The exemplary embodiment has been described with reference to the preferred embodiments, but further modifications and alterations encompass the preceding detailed description. These modifications and alterations also fall within the scope of the appended claims or the equivalents thereof.

What is claimed is:

1. A polymeric foam synthesized from high internal phase emulsion precursor with inert diluent, wherein the high internal phase emulsion precursor contains oil phase consisting of monomers 2-ethylhexyl acrylate (EHA), 2-ethylhexyl methacrylate (EHMA), and ethylene glycol dimethacrylate (EGDMA), at a ratio of (25-55):(25-55):(15-25) by mass.

2. The polymeric foam according to claim 1, wherein the polymeric foam includes a continuous open-celled network of pores with micrometer-sized voids defined by connecting struts having nanometer-sized pores formed in or on a surface of each of the connecting struts so that the voids and the pores: (i) collapse into irregular shapes when the polymeric foam is dry and (ii) expand into cellular, circular, or spherical shapes when the polymeric foam is exposed to an aqueous solution having a discrete oil or hydrocarbon phase dispersed therein.

3. The polymeric foam according to claim 1, wherein the inert diluent is toluene.

4. The polymeric foam according to claim 3, wherein the toluene concentration in the oil phase was varied from greater than 0 wt. % to equal to or less than 80 wt %.

* * * * *